United States Patent

Davis et al.

[15] 3,654,505

[45] Apr. 4, 1972

[54] BLACK ENAMEL GLASS FOR CATHODE-RAY TUBE

[72] Inventors: Earl K. Davis, Tempe; Kent W. Hansen, Scottsdale, both of Ariz.; Yemmanur Jayachandra, Melrose Park, Ill.

[73] Assignee: Motorola, Inc., Franklin Park, Ill.

[22] Filed: June 5, 1970

[21] Appl. No.: 50,405

[52] U.S. Cl.............................313/92 B, 313/112, 106/53, 313/64
[51] Int. Cl................H01j 31/20, H01k 1/26, H01j 29/18
[58] Field of Search...............................313/92 LF, 92, 112

[56] References Cited

UNITED STATES PATENTS

| 3,362,804 | 1/1968 | Hamilton | 65/18 |
| 3,455,708 | 7/1969 | Earl | 106/53 |
| 3,563,771 | 2/1971 | Tung | 106/47 |
| 2,805,360 | 9/1957 | McNaney | 313/92 X |
| 2,996,634 | 8/1961 | Woodcock | 313/92 |
| 3,303,374 | 2/1967 | Fyler | 313/92 LF |

*Primary Examiner*—Robert Segal
*Attorney*—Mueller and Aichele

[57] ABSTRACT

A faceplate of a color cathode ray tube has a black enamel glass with holes interspaced therethrough. Color phosphor areas are positioned within the holes in the black enamel glass.

1 Claims, 2 Drawing Figures

Patented April 4, 1972

3,654,505

INVENTORS
EARL K. DAVIS
KENT W. HANSEN
YEMMANUR JAYACHANDRA

BY *Mueller & Aichele*

ATTYS.

BLACK ENAMEL GLASS FOR CATHODE-RAY TUBE

BACKGROUND OF THE INVENTION

This invention relates to cathode ray tubes used in color reproduction and more particularly to a faceplate of a tube having a black enamel glass thereon for providing improved contrast and brightness.

Cathode ray tubes for producing color have an evacuated envelope made of glass having an enlarged end carrying a front plate commonly referred to as a faceplate. This invention is concerned with the faceplate structure of the evacuated envelope. On the inside surface of the faceplate a suitable phosphor layer converts the energy of the electrons into light. It is known to coat the entire inside surface of the image screen excluding the elemental phosphor areas with a light absorbing material such as black manganese dioxide. The purpose of this light absorbing material is to increase the brightness and color contrast formed on the screen. The black powder can be bonded to the screen with a resin.

SUMMARY OF THE INVENTION

It is an object of this invention to provide an improved color producing cathode ray tube. It is another object of this invention to provide a color cathode ray tube having an improved faceplate. It is yet another of this invention to provide a faceplate having improved contrast and brightness.

These and other objects are accomplished by a cathode ray tube having a thin layer of black glass bonded to the inside surface of the faceplate of the tube envelope. The black glass layer has holes interspersed therethrough in which the phosphor areas are located. All of the phosphor color areas are surrounded by the black enamel glass.

Other objects and advantages of this invention will be apparent from the following detailed description, reference being made to the accompanying drawings wherein a preferred embodiment of this invention is shown.

IN THE DRAWINGS

DETAILED DESCRIPTION OF THE ILLUSTRATIVE EMBODIMENT

Figure 1:
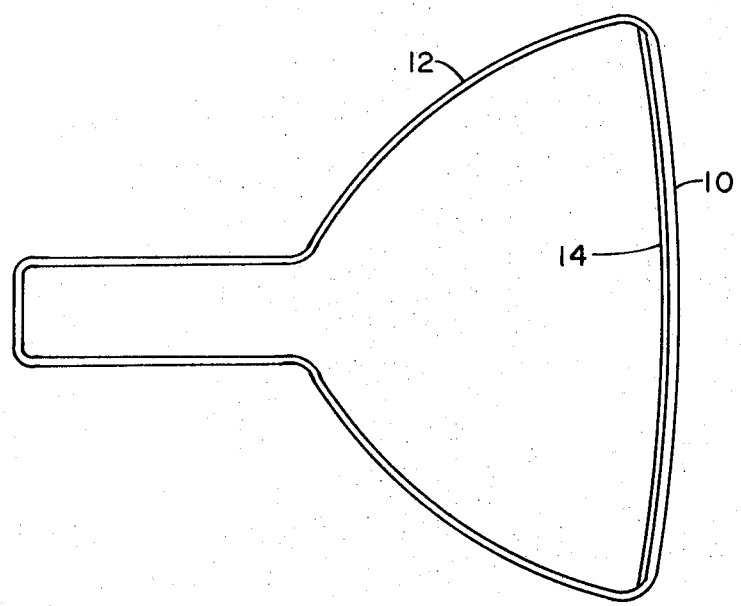
FIG. 1 is a color producing cathode ray tube having a layer of black enamel glass on the faceplate.
Figure 2:
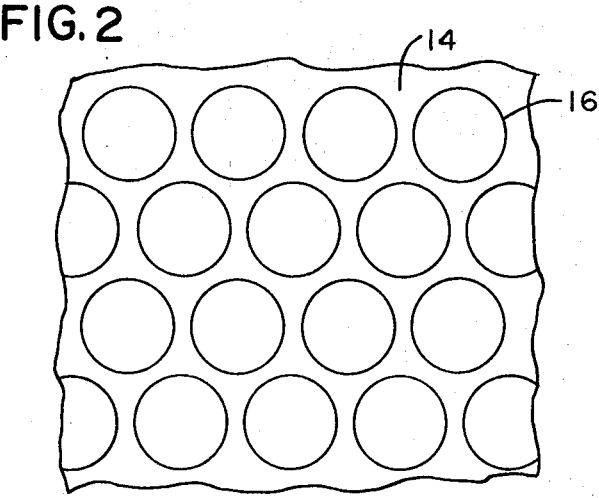
FIG. 2 is a front view of the faceplate showing the arrangement of the black glass and the phosphor areas.

In accordance with this invention as shown in FIG. 1, the generally concave front plate or faceplate 10 of a color producing cathode ray tube 12 has a layer 14 of black glass thereon for the purpose of increasing the visual contrast of the phosphor areas. The phosphor areas 16 as shown in FIG. 2 are a mixture of separate red phosphor regions, blue phosphor regions and green phosphor regions in substantially equal numbers. While the size of the different colored phosphor regions are usually the same, they may vary in size as is known in the art. Surrounding the colored phosphor regions 16 is, in accordance with this invention, the layer 14 of black enamel glass. This black enamel glass layer 14 increases the contrast and sharpens the picture. The composition of the black enamel glass is listed below.

| | |
|---|---|
| $SiO_2$ | 2 to 7 weight percent |
| PbO | 60 to 75 weight percent |
| $B_2O_3$ | 8 to 15 weight percent |
| $MnO_2$ | 2 to 10 weight percent |
| $Co_2O_3$ | 0 to 10 weight percent |
| ZnO | 0 to 12 weight percent |
| BaO | 0 to 2 weight percent |
| CdO | 0 to 2 weight percent |
| MgO | 0 to 2 weight percent |
| CaO | 0 to 2 weight percent |
| SrO | 0 to 2 weight percent |

A black enamel glass having a composition in accordance with this invention will have the properties required to be compatible with the surface of the glass front plate. Most black glasses can readily be etched in a strong acid such as hydrofluoric acid. However, strong acids cannot be used in this system because they would also etch the surface of the front plate, thereby ruining the same. Glasses having the composition set forth above are readily etchable in a weak acid, preferably dilute nitric acid or acetic acid and do not require a strong acid to etch them.

It is also necessary that the black glass composition seal to the picture tube at temperature below 500° C, a temperature at which the cathode ray tube deforms. Black glass compositions in accordance with this invention form a black enamel in the temperature range of 400° to 475° C with a preferred temperature range being 435° to 455° C.

In accordance with this invention, the inside concave surface of the front plate 10 is coated with a thin layer of the black enamel glass composition. The thickness of this layer is of the order of one-half mil although it may vary 0.25 mils to 2.0 mils. The tube and the black glass layer are fired at a temperature of the order of 435° C to 455° C in order to fuse the black enamel glass and bond it to the front plate. A layer of photoresist is then applied on top of the black glass layer as is well known in the art. An appropriate mask is used to form the desired pattern in the photoresist. Using the photoresist mask, holes are etched into the black glass with dilute nitric acid, for example, a 10 percent nitric acid solution or another weak acid such as acetic acid. The concentration of these acid etchants is not critical, the only criteria is that they do not etch or attack the surface of the front plate. After the holes have been etched in the black glass, colored phosphors are formed on the surface of the faceplate in the etched holes in accordance with standard procedures, as by orienting the front plate 10 in a position to act as a container over its concave surface, covering said surface to at least fill the holes with a soluble photosensitive phosphor slurry containing suspended phosphors of the desired color, and then using known spin-coating processes to obtain a generally dried slurry coating and light exposure techniques to render the exposed slurry coating insoluble, or alternatively using a settling process to settle the suspended phosphors from a solution to deposit the phosphors on the front plate 10 within the holes.

EXAMPLE NO. 1

A black enamel glass composition containing 2.0 weight percent $SiO_2$, 70.0 weight percent PbO, 11.25 weight percent ZnO, 5.0 weight percent $MnO_2$, 10.0 weight percent $B_2O_3$, 0.25 weight percent BaO, 0.25 weight percent CdO, 0.25 weight percent MgO, 0.25 weight percent CaO, 0.25 weight percent SrO and 0.50 weight percent $V_2O_5$ was melted at 1100° C in a platinum crucible and stirred with a platinum propeller stirrer to homogenize the molten glass. This was followed by quenching in water to make a black enamel frit composition. A layer of black enamel was applied to the front plate by spinning the envelope which contained a suspension of the black frit. The black enamel was fired for 1 hour at a temperature between 435° to 455° C. The black enameled surface appeared smooth, glossy and free of surface devitrification. The black glass was patterned with a photoresist mask and holes etched therein with dilute nitric acid. This glass is readily soluble in dilute nitric acid which will not attack the front plate. The concave surface of the front plate was then coated with colored phosphors. The coefficient of expansion of the black enamel was $103.1 \times 10^{-7}$ per degrees C (average 25° to 300° C). The glass front plate, that is Corning's No. 9010 glass, has a coefficient of expansion value of $89 \times 10^{-7}$ per degrees C between 0° and 300° C.

Examples 2 through 6 are given in the following table:

EXAMPLE

| 2 | 3 | 4 | 5 | 6 |
|---|---|---|---|---|

| | | | | | |
|---|---|---|---|---|---|
| SiO$_2$ | 4.91 | 4.91 | 4.0 | 5.0 | 5.0 |
| PbO | 64.06 | 64.06 | 63.5 | 64.0 | 64.0 |
| ZnO | 9.81 | 9.26 | 8.25 | 8.0 | 8.0 |
| MnO$_2$ | 7.36 | 7.00 | 6.0 | 7.0 | 4.6 |
| Co$_2$O$_3$ | 2.09 | 3.00 | 70 | 3.0 | 5.4 |
| B$_2$O$_3$ | 11.7 | 11.7 | 11.25 | 12.0 | 12.0 |
| BaO | — | — | — | 0.5 | 0.5 |
| CdO | — | — | — | 0.5 | 0.5 |
| MgO | — | — | — | — | — |
| CaO | — | — | — | — | — |
| SrO | — | — | — | — | — |
| V$_2$O$_5$ | — | — | — | — | — |
| | 100.00 | 100.00 | 100.00 | 100.00 | 100.00 |
| Coefficient of Expansion X10$^{-7}$ per °C. (Ave 25°–300° C.) | 88.8 | 89.5 | 90.6 | 89.1 | 89.7 |
| Density (g./cm.$^3$) | 5.84 | 5.83 | 5.91 | 5.85 | 5.84 |

The glass composition set forth in Examples 2 through 6 were prepared and applied in the manner set forth in Example No. 1. The compositions of Examples 5 and 6 formed enamel surfaces which were smooth, glossy and free of surface devitrification. The enamel surfaces of Examples 2, 3 and 4 were not as glossy due to the presence of surface devitrification. The glasses in Examples 1 through 6 were sufficiently soft so that the enamel coating formed therefrom could be obtained by firing in the same cycle as the devitrification solder glass used to seal the faceplate portion of the tube to the funnel, that is, at temperature of 435° to 450° C for 1 hour.

While a preferred method of forming the black enamel glass is to use a black enamel frit which is applied to the surface of the faceplate, the black enamel glass can be prepared by using a mixture of a base glass and a colorant. The base glass compositions are mixed with the colorant composition to form a mixture which can be enameled on the faceplate by firing it in the temperature range of 435° to 475° C for 1 hour. The precise temperature is a function of the base glass used and the amount of colorant in the mixture.

The base glass composition is as follows:

| | |
|---|---|
| SiO$_2$ | 3 to 6 weight percent |
| PbO | 65 to 75 weight percent |
| B$_2$O$_3$ | 9 to 14 weight percent |
| ZnO | 0 to 10 weight percent |
| BaO | 0 to 2 weight percent |
| CdO | 0 to 2 weight percent |
| MgO | 0 to 2 weight percent |
| CaO | 0 to 2 weight percent |
| SrO | 0 to 2 weight percent |

Examples Nos. 7 and 8 set forth the composition of two base glasses

| | Example 7 | Example 8 |
|---|---|---|
| SiO$_2$ | 4.60 | 5.8 |
| PbO | 72.99 | 72.2 |
| ZnO | 9.48 | 7.4 |
| BaO | — | .8 |
| CdO | — | .8 |
| B$_2$O$_3$ | 12.93 | 13.0 |
| | 100.00 | 100.00 |
| Coefficient of Expansion X10$^{-7}$/°C. (Ave 25°–300° C.) | 92.8 | 91.3 |

The composition of the colorant in this mixture is as follows:

| | |
|---|---|
| MnO$_2$ | 10 to 70 weight percent |
| Co$_2$O$_3$ | 10 to 70 weight percent |
| Fe$_2$O$_3$ | 0 to 50 weight percent |
| Cr$_2$O$_3$ | 0 to 50 weight percent |
| NiO | 0 to 50 weight percent |
| B$_2$O$_3$ | 0 to 50 weight percent |

The following Examples 9 and 10 are colorant compositions which have been found to be preferred embodiments.

| | Example 9 | Example 10 |
|---|---|---|
| MnO$_2$ | 70 weight percent | 53.8 weight percent |
| Co$_2$O$_3$ | 30 weight percent | 46.2 weight percent |

The colorant batch is mixed and heated to about 1000° C to remove excess gases that would otherwise be driven off during subsequent firing at about 450° C and to obtain a solid state reaction between the colorant oxides.

The mixtures used in accordance with this invention to form a black enamel contain 5 to 30 percent colorant and 70 to 95 percent base glass. The mixture is ground and mixed by ball milling until the desired space particle size is obtained for enamel.

The following table lists examples of a number of mixtures containing colorants and base glasses.

| Example | Base Glass | Colorant Type | Weight Percent |
|---|---|---|---|
| 11 | Example 7 | Example 10 | 13 |
| 12 | Example 8 | Example 9 | 10 |
| 13 | Example 8 | Example 10 | 10 |
| 14 | Example 8 | Example 10 | 13 |
| 15 | Example 8 | Example 10 | 20 |
| 16 | Example 8 | Example 10 | 30 |

Examples 11 through 15 were found to enamel well when heated for one hour at a temperature in the range of 435° to 455° C. Example 16 required heating to a temperature of 455° to 475° C. In general, the opacity increases as the concentration of the colorant increases.

The black enamel glass formed from a black glass frit or from a mixture of a colorant and a base glass provides a cathode ray tube faceplate with a light absorbing material surrounding the phosphor areas thereby increasing the contrast formed on the faceplate. The black enamel formed in accordance with this invention has the characteristics required to be compatible for use in a color cathode ray tube assembly.

We claim:

1. A color reproducing cathode ray tube comprising a clear faceplate suitable for use as a multi-color image screen, a thin layer of black colored glass fused to said faceplate, said glass layer having a plurality of essentially planar holes therein, and a plurality of elemental phosphor areas located in said holes on said faceplate wherein said black glass increases the brightness and contrast characteristics of said tube, the composition of said black glass being:

| | |
|---|---|
| SiO$_2$ | 4 to 5 weight percent |
| PbO | 63 to 65 weight percent |
| B$_2$O$_3$ | 10 to 12 weight percent |
| MnO$_2$ | 5 to 7 weight percent |
| Co$_2$O$_3$ | 2 to 5 weight percent |
| ZnO | 8 to 11 weight percent |
| BaO | 0 to 2 weight percent |

| | |
|---|---|
| CdO | 0 to 2 weight percent |
| MgO | 0 to 2 weight percent |
| CaO | 0 to 2 weight percent |
| SrO | 0 to 2 weight percent |

* * * * *